(12) United States Patent
Wu

(10) Patent No.: US 7,830,075 B2
(45) Date of Patent: Nov. 9, 2010

(54) REFLECTOR FOR TRANSMISSION OF A DESIRED BAND OF WAVELENGTHS OF ELECTROMAGNETIC RADIATION

(75) Inventor: Kuohua Wu, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1215 days.

(21) Appl. No.: 11/262,195

(22) Filed: Oct. 28, 2005

(65) Prior Publication Data
US 2007/0097691 A1    May 3, 2007

(51) Int. Cl.
*H01J 61/35* (2006.01)
*F21V 9/00* (2006.01)

(52) U.S. Cl. .................... 313/113; 313/25; 313/112; 313/634; 313/635; 313/111; 359/359; 359/584; 359/883; 362/293

(58) Field of Classification Search ................ 313/110, 313/113
See application file for complete search history.

(56) References Cited

U.S. PATENT DOCUMENTS

| | | | |
|---|---|---|---|
| 2,914,989 A * | 12/1959 | Gretener ...................... 359/360 |
| 3,247,392 A * | 4/1966 | Thelen ........................ 250/226 |
| 3,944,320 A * | 3/1976 | McLintic ..................... 359/360 |
| 4,160,929 A * | 7/1979 | Thorington et al. ......... 313/112 |
| 4,315,186 A | 2/1982 | Hirano et al. |
| 5,146,130 A * | 9/1992 | Kawakatsu .................. 313/112 |
| 5,621,267 A | 4/1997 | Shaffner et al. |
| 5,887,965 A | 3/1999 | Edens et al. |
| 5,993,037 A | 11/1999 | Tomioka et al. |
| 6,163,750 A | 12/2000 | Nojima |
| 6,172,810 B1 * | 1/2001 | Fleming et al. ............. 359/529 |
| 6,429,587 B1 | 8/2002 | Sugimachi et al. |
| 6,627,307 B1 * | 9/2003 | Reichert et al. ............ 428/332 |
| 6,896,392 B2 | 5/2005 | Jigamian et al. |
| 6,967,443 B2 * | 11/2005 | Bigio et al. ................. 313/635 |
| 6,970,287 B1 * | 11/2005 | Watkins et al. ............. 359/368 |
| 7,347,592 B2 * | 3/2008 | Mardilovich et al. ........ 362/341 |
| 2001/0052948 A1 * | 12/2001 | Okamoto et al. ............. 349/12 |
| 2002/0067542 A1 | 6/2002 | Okamor et al. |
| 2002/0195942 A1 * | 12/2002 | Hayashi et al. ............. 313/635 |
| 2003/0098652 A1 * | 5/2003 | Beech et al. ................ 313/634 |
| 2004/0057250 A1 | 3/2004 | Roberts et al. |
| 2004/0095779 A1 | 5/2004 | Schottland et al. |

\* cited by examiner

*Primary Examiner*—Sikha Roy

(57) ABSTRACT

A cool light source includes a reflector having a band-reject reflective coating and an underlying absorptive coating. The cool light source also includes a window with a band-pass transmission function that is substantially complimentary to the band-reject reflective coating.

27 Claims, 12 Drawing Sheets

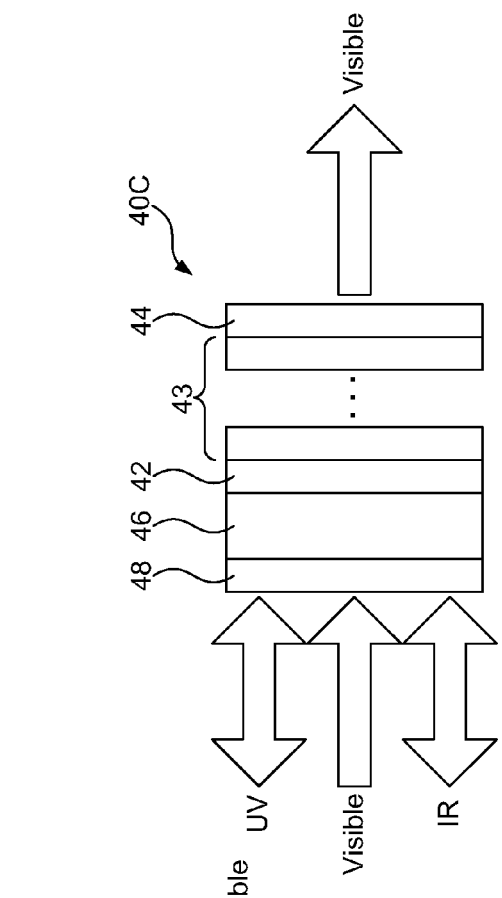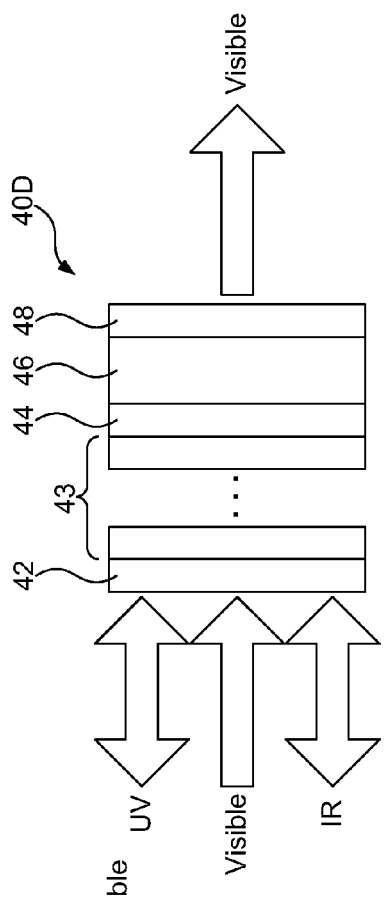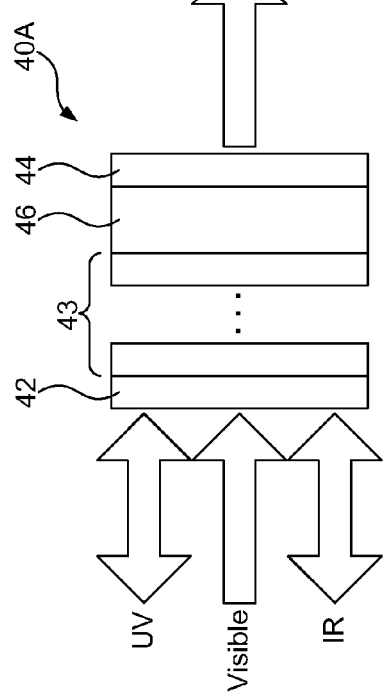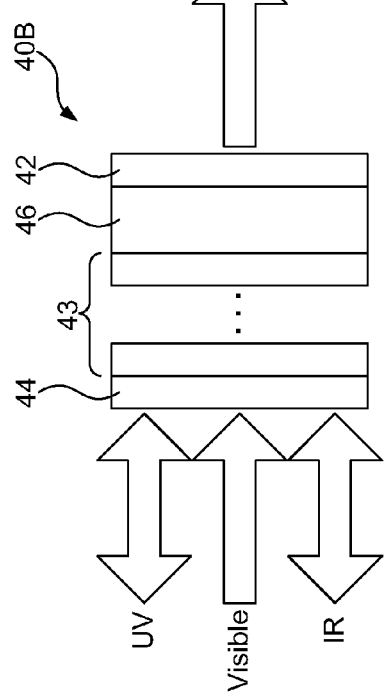

REFLECTOR FOR TRANSMISSION OF A DESIRED BAND OF WAVELENGTHS OF ELECTROMAGNETIC RADIATION

CROSS REFERENCE TO RELATED APPLICATIONS

This application is related to U.S. patent application Ser. No. 11/176,028, filed Jul. 6, 2005 and further related to U.S. patent application Ser. No. 11/074,490, filed Mar. 7, 2005 and further related to U.S. patent application Ser. No. 11/179,117, filed Jul. 12, 2005 all of which are hereby incorporated by reference in their entirely.

BACKGROUND

Many projection systems and other imaging devices incorporate high intensity arc-light sources that have small point sources that are called "fireballs." The fireball is usually located within a concave reflector that has a focal point, such as a parabolic, elliptical, or other curved shaped mirror. The light emanating from the fireball in the focal point is reflected off the surface of reflector. Often times the reflector is made of a glass, metal, or other substrate that requires a special coating to be applied to provide a specular surface for reflection. When the reflector is fabricated, the special coating may be deposited, sprayed, dipped, painted, or otherwise applied to the reflector surface. For instance, a silver reflective coating may be applied to the reflector to reflect all wavelengths of visible, infra-red (IR), and ultra-violet (UV) radiation.

Often times the light source may need to supply only a limited band of frequencies, such as visible light in video projection systems. For instance, a xenon lamp typically emits about 68% of its emissions in the UV and IR radiation and these unwanted emissions may need to be filtered out. Other applications may only require a band of UV radiation such as in semiconductor lithography. Still other application may just require a band of IR radiation such as with thermal imaging.

Because various applications just require a portion of the light source radiation, typically a "cut" or absorptive filter is placed in the optical path of the light source to absorb the unwanted wavelengths to prevent other optical components from being damaged. Typically this cut filter needs to be cooled effectively to prevent degradation such as clouding which might affect the performance of the desired transmitted radiation.

Accordingly, it would be desirable to have a light source that only provided the desired wavelengths in order to simplify optical and thermal designs in various applications.

BRIEF DESCRIPTION OF THE DRAWINGS

The invention is better understood with reference to the following drawings. The elements of the drawings are not necessarily to scale relative to each other. Rather, emphasis has instead been placed upon clearly illustrating the invention. Furthermore, like reference numerals designate corresponding similar though not identical parts through the several views.

FIGS. 6A-6D are cross-sectional views of various embodiments of a high transmission filter used in the various light source embodiments.

DETAILED DESCRIPTION

Figure 1:
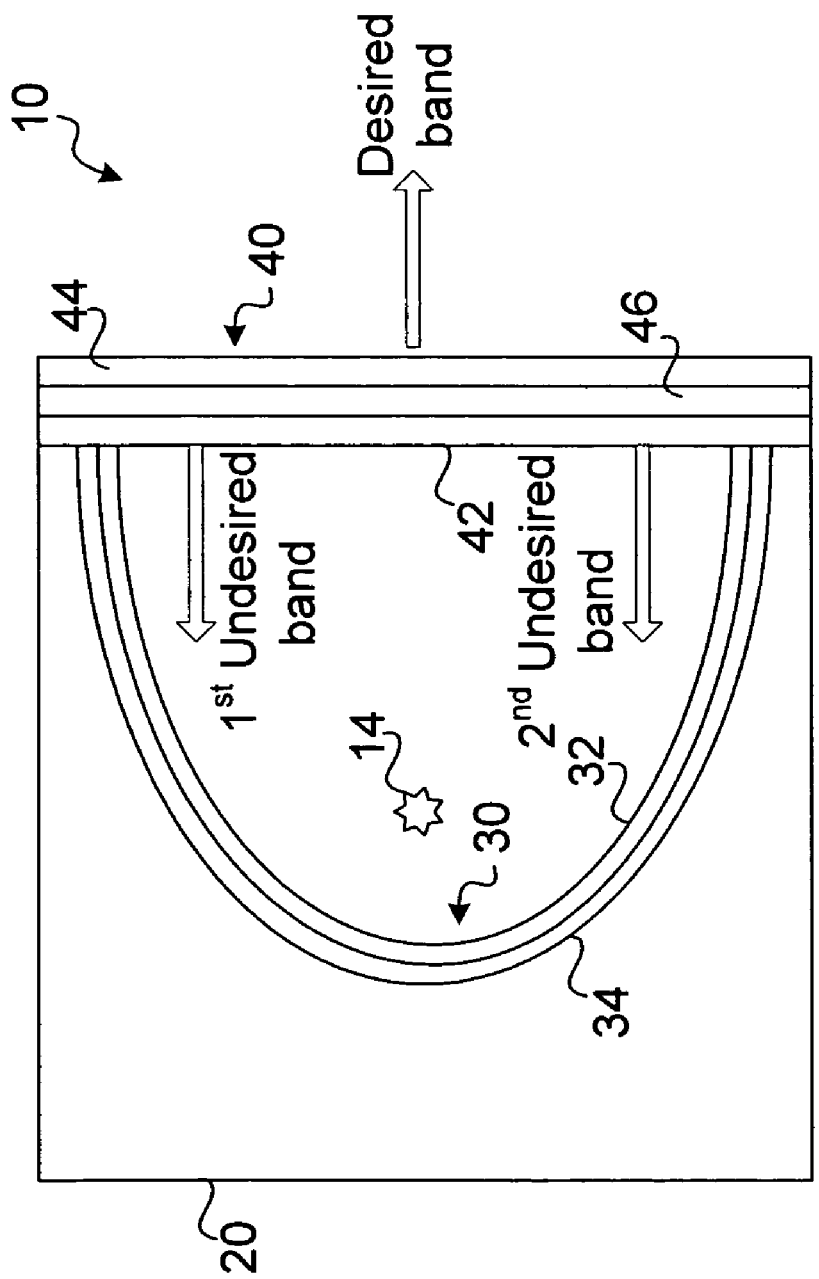
FIG. 1 is a cross-sectional view of a cold light source according to one embodiment.

FIG. 1 illustrates one embodiment of a cold light source (10) implemented as a reflector (20) that incorporates at least one special filter coating on a reflector window (46) to create a filter window (40). This filter window (40) is designed to allow a desired band of wavelengths of electromagnetic radiation or energy from fireball (14) to be transmitted through it such as indicated by the visible light arrow. The filter window (40) is also designed to substantially reflect back, rather than absorb, any undesired wavelengths, such as indicated by the first and second undesired band arrows. These undesired wavelengths are then absorbed by a special coating (30) on the reflector (20). This special coating (30) is designed with a band-reject reflective layer (32) to reflect wavelengths in the desired band of wavelengths and passing through at least partially the undesired wavelengths to be absorbed in an absorptive layer (34). Reflector (20) is preferably an aluminum or copper substrate with a concave cavity. However, other metals or thermally conductive substrates can be used such as quartz, glass, plastic, and ceramic, just to name a few.

For example, in one embodiment in which just visible light is desired, wavelengths in the range of about 400 nm (nanometers) to about 700 nm is allowed to be reflected from the band-reject reflective layer (32) and transmitted through the visible band pass filter coatings (42, 44) on the filter window (40). Wavelengths in the non-visible spectrum such as UV and IR are at least partially absorbed by the special reflective coating (30) by absorptive layer (34). Any remaining undesired wavelengths that are not absorbed but reach the filter window (40) are reflected back to the special reflective coating 30 and are further absorbed. The filter window (40) may include a quartz, glass, or other clear substrate (46).

Since the undesired wavelengths are not allowed to exit through the filter window (40) and are thus reflected back to the reflector (20), the special reflective coating (30) absorptive properties may be relaxed as multiple bounces of undesired wavelengths between the filter window (40) and the reflector (20) will eventually be absorbed. The absorbed wavelengths are converted from photonic to thermal energy which can then be emissively or conductively transferred as required. By relaxing the absorptive properties of the special reflective coating 30, less process steps may be used during manufacturing of the reflector (20) thereby saving cost and increasing yields.

By converting the undesired wavelengths to thermal energy, the reflector (20) can have a lower operating temperature as the heat can be readily removed by convectively or emissively as required in a given application. For instance, by maintaining a lower operating temperature and using a metal reflector body, the thermal gradient profile of the reflector can be reduced to prevent intensive air circulation within an enclosed reflector cavity, such as with a closed environment xenon light source. Additionally, such as with a bulb source, for instance, an ultra high pressure mercury bulb, the outer surface of the reflector neck where the bulb is located can be stabilized where in prior art designs, this area usually has the highest temperature gradient. Therefore, by reducing the temperature gradient and operating temperature of the reflector (20), a more reliable temperature measurements can be taken if needed. Further, the lifetime and reliability of the light source (10) may be improved.

Optimally, but optionally, the filter window (40) is designed to have as close to 100% transmission of the desired wavelengths. The undesired wavelengths are reflected as close to 100% from the filter window (40). Since in most embodiments, the filter window may be flat, multiple coatings of dielectrics or other materials are more easily deposited thereon as compared to their deposition on the deep curved surface of reflector (20). To achieve this high reflectivity and transmittance objective, one embodiment of the filter window (40) includes at least two sections of filter coatings (42, 44), each designed to optimize the transmittance of desired wavelengths and the reflectance of at least one band of undesired wavelengths. For instance, one embodiment includes a short-wave pass filter (42) in series with a long-wave pass filter (44). The short-wave pass filter (42) is designed to optimize transmittance of visible light while reflecting IR light and optimizing cut-off of longer undesired wavelengths. The long-wave pass filter (44) is designed to pass wavelengths from the visible and IR while reflecting UV light and optimizing the cut-off of shorter undesired wavelengths. In addition, as required depending on the light source, an additional far IR filter can be added to allow transmission of the desired wavelengths and reflection of wavelengths in the far IR region (i.e. greater than 1400 nm). More detail of specific embodiments follow below.

It should be noted that the drawings are not true to scale. Further, various parts of the device elements have not been drawn to scale. Certain dimensions have been exaggerated in relation to other dimensions in order to provide a clearer illustration and understanding of the present embodiments.

In addition, although the embodiments illustrated herein are shown in two-dimensional views with various regions having depth and width, it should be clearly understood that these regions are illustrations of only a portion of a device that is actually a three-dimensional structure. Accordingly, these regions will have three dimensions, including length, width, and depth, when fabricated on an actual device.

Moreover, while the present invention is illustrated by various embodiments directed to light devices for projection systems, it is not intended that these illustrations be a limitation on the scope or applicability of the present invention. It is not intended that the light devices of the present invention be limited to the physical structures illustrated. These structures are included to demonstrate the utility and application of the present invention to presently preferred embodiments but may be altered as required to suit a particular product or application without deviating from the scope and spirit of the claimed invention. For instance, while a reflector assembly for a projector is generally described, the invention can be used with any device such as a medical equipment or photo-lithography devices.

Figure 2:
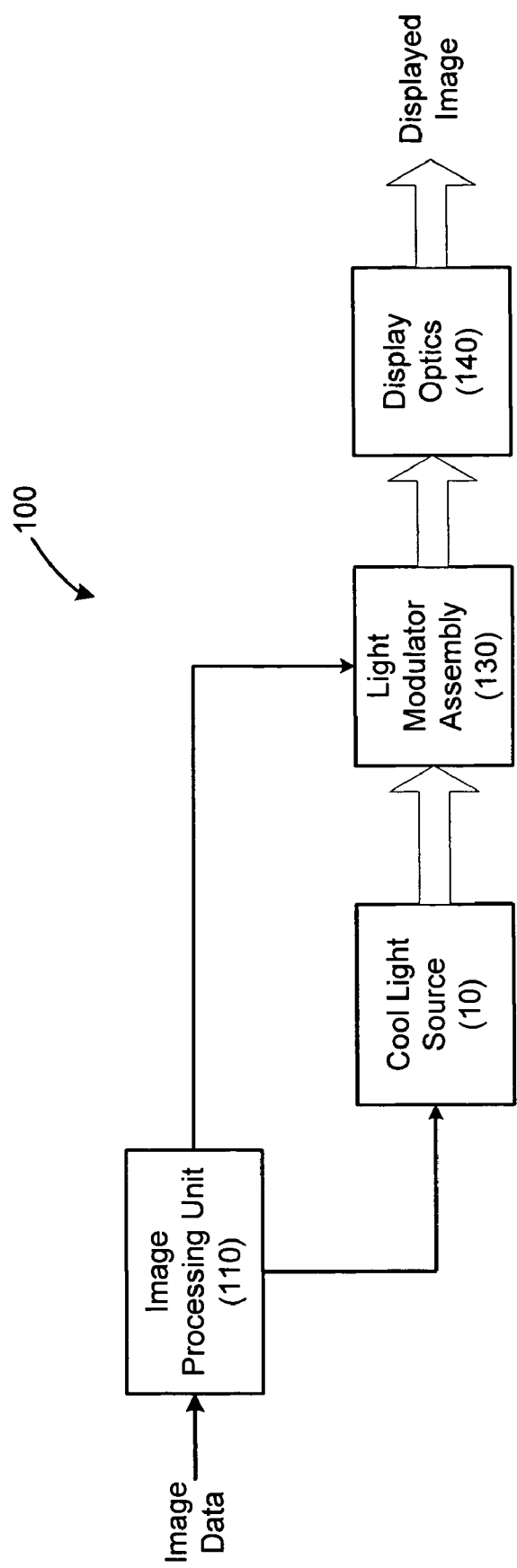
FIG. 2 is a block diagram of projection system according to one embodiment.

FIG. 2 is a block diagram of an embodiment of a projection system (100) which incorporates an embodiment of the cold light source (10). The projection system (100) includes an image processing unit (110) that accepts image data in the form of still or moving (video) images. The image data may be in analog or digital form, further in interlaced or progressive format, and sampled appropriately by the image processing unit (110). The image processing unit (110) may include a computer or other logic that controls the cold light source (10) and a light modulator assembly (130) to generate a modulated optical image that is projected by display optics (140) to create a displayed image.

The light modulator assembly (130) may include one or more light modulators that are used to modulate the light from the cold light source (10) by polarization, intensity, phase, physical angle (direction), interference, diffraction, color (frequency) or passage over time to create the modulated optical image.

The display optics (140) can be any optical system such as those used in projectors, overhead viewers, televisions, computer monitors, and video games, just to name a few. The design of the display optics (140) can be for direct view or projection onto a front or rear facing screen. The display optics (140) can include additional optics or circuitry on a projection screen in order to improve contrast, gamut, viewing angle, or reduction of video artifacts.

Figure 3:
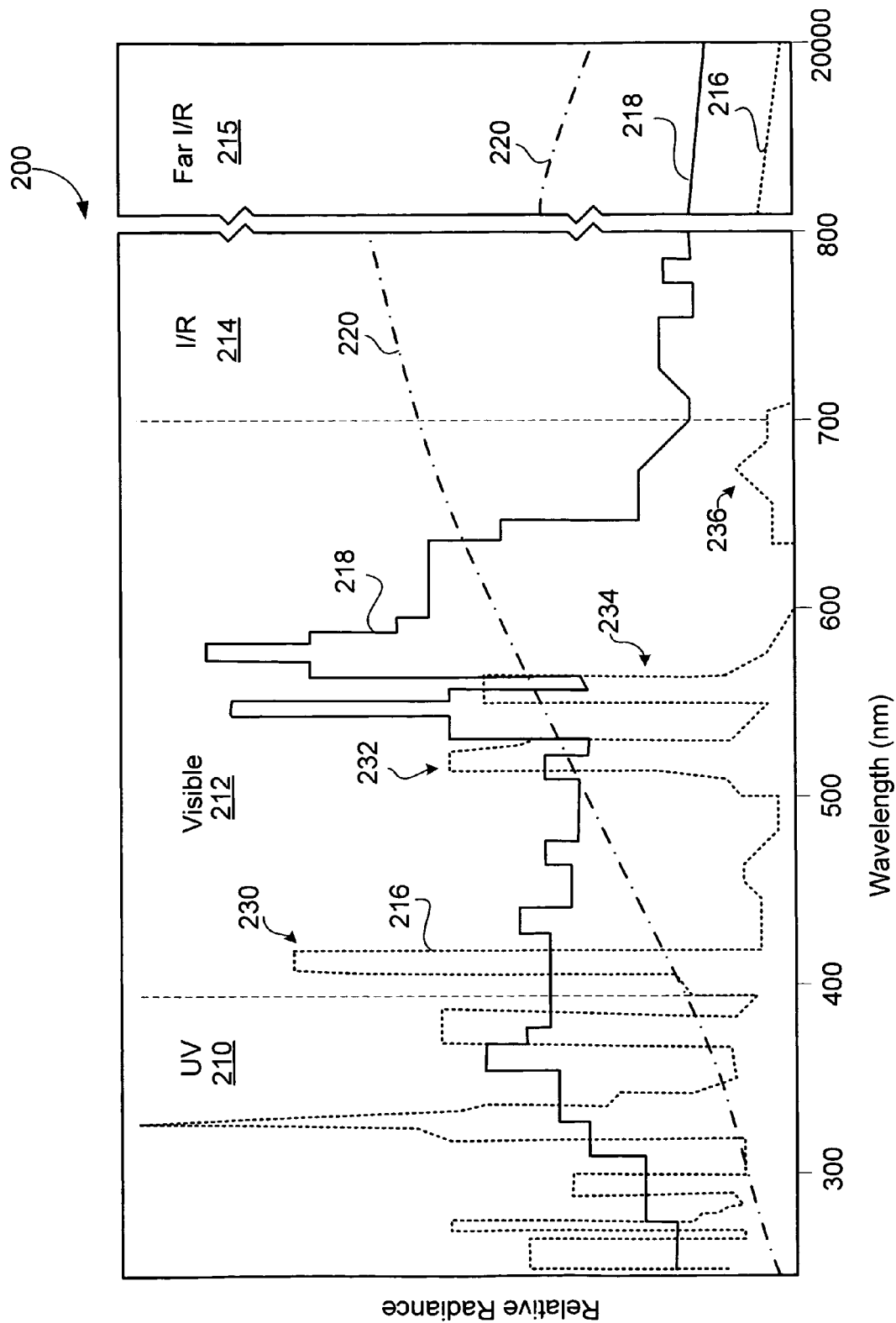
FIG. 3 is an exemplary wavelength vs. relative radiance chart of possible light sources used in various embodiments.

FIG. 3 is an exemplary chart of wavelength vs. relative radiance for three different types of light sources, mercury-arc (216), xenon-arc (218), and halogen (220). Other light sources such as metal halide can also be used. The wavelengths are shown from the WV region (210) (less than about 400 nm), the visible region (212) (about 400 nm to about 750 nm), the near IR region (214) (about 750 nm to about 1400 nm) cut shot of the far IR region (215) (greater than about 1400 nm). The mercury-arc (216) has several distinct wavelength peaks with a blue peak (230), green peak (232), yellow peak (234) and red peak (236) in the visible region (212). The mercury-arc (216) also has numerous peaks in the UV region (210) as well as an increasing IR output in the far IR region (215). The xenon-arc (218) has a more uniform output but still has peak in the visible region (212), especially in the yellow area. The halogen (220) light source is more of a black body radiation and thus has an increasing output from the UV region (210) through the visible region (212) and into the near IR region (214). Within the far IR region (215), the output of the halogen (220) light source tapers off. However, as illustrated, there is still significant radiance from the three light sources within the UV region 210 and far IR region 215 which may be desired or undesired depending on the application.

Figure 4:
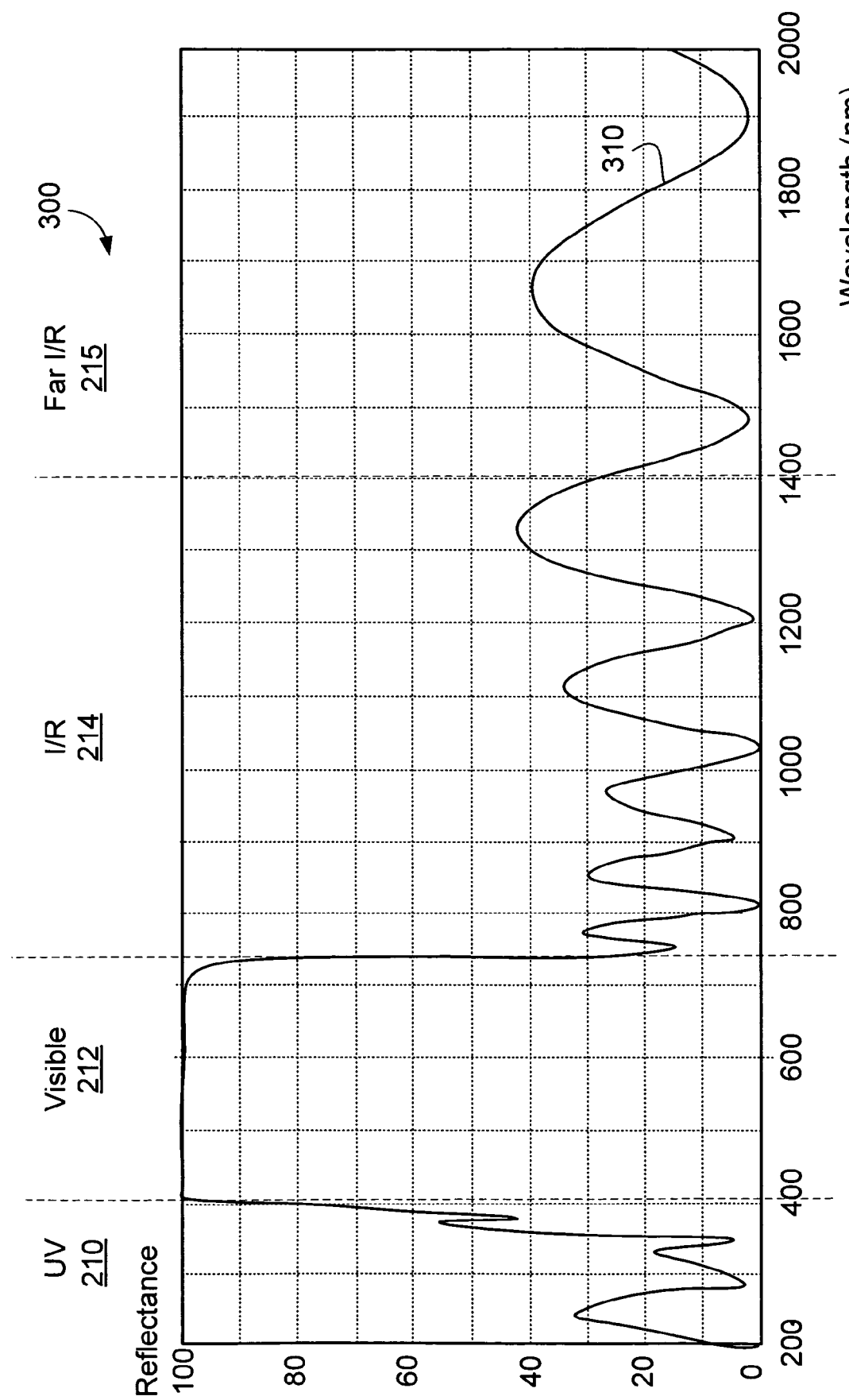
FIG. 4 is an exemplary wavelength vs. reflectance chart of an embodiment of a reflector coating according to one embodiment.

FIG. 4 is an exemplary reflectance chart (300) of one embodiment of an optical coating for the reflector (20, FIG. 1) which provides for near 100% reflection in the visible region (212) and partial absorption in the UV region (210), near IR region (214) and far IR region (215). Although, there are areas in the reflectance function (310) in which these undesired regions have good absorption, there are bands which have only about 40% absorption or 60% transmittance. However, if a photon is not absorbed on a first reflection from this special optical coating, if it is reflected off the reflector window and strikes again, it has another 40% absorption. This multiple chance of absorption means that there is a 16% chance of second reflection. After another reflection from the reflector window to the reflector, the chance of reflection is reduced to 6%. Therefore, there is less need to make the special reflective coating on the reflector have a high absorption rate in the non-desired regions as any unwanted wavelengths will ultimately be absorbed. Even with an absorption of the undesired wavelengths in the 60% range, only about 5 bounces are required to reduce the chance of reflection to less than 6%. Therefore, the degree of transmittance or absorption can be greater than 50% and still be acceptable with the use of the filter window (40).

Figure 5A:
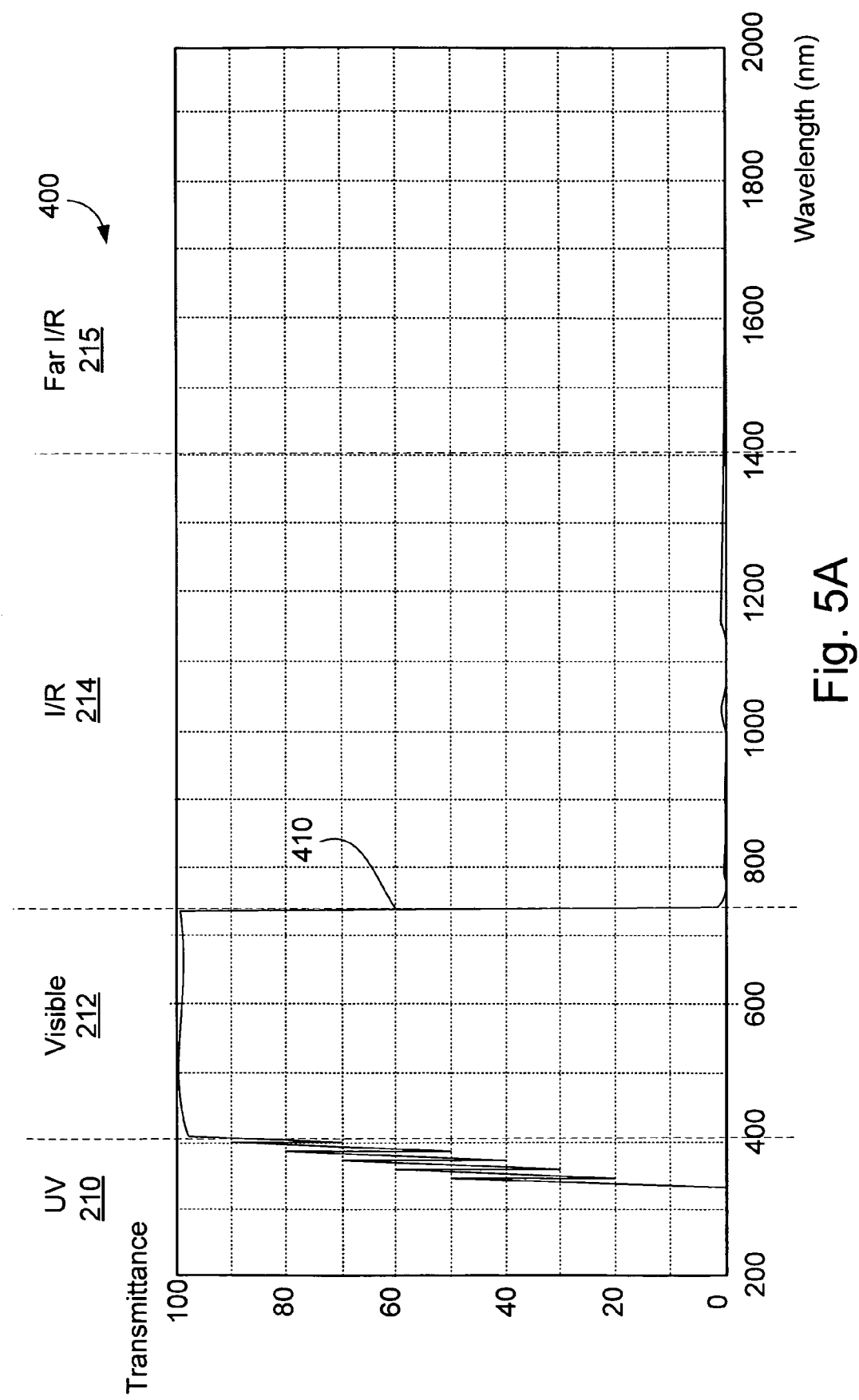
FIG. 5A is an exemplary wavelength vs. transmission chart of an embodiment of a visible high transmission window short-wave band coating.
Figure 5B:
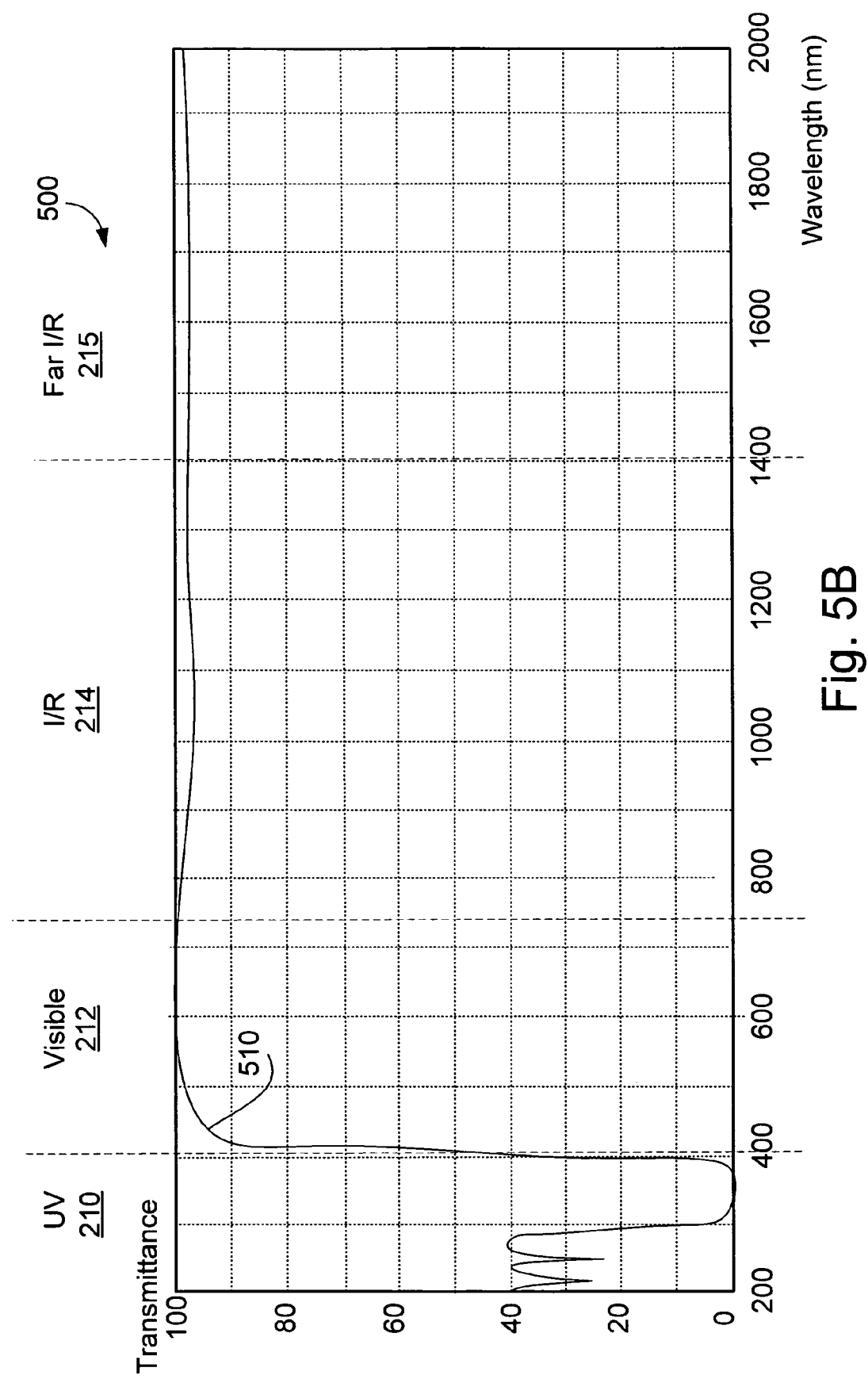
FIG. 5B is an exemplary wavelength vs. transmission chart of an embodiment of a visible high transmission window long-wave band coating.
Figure 5C:
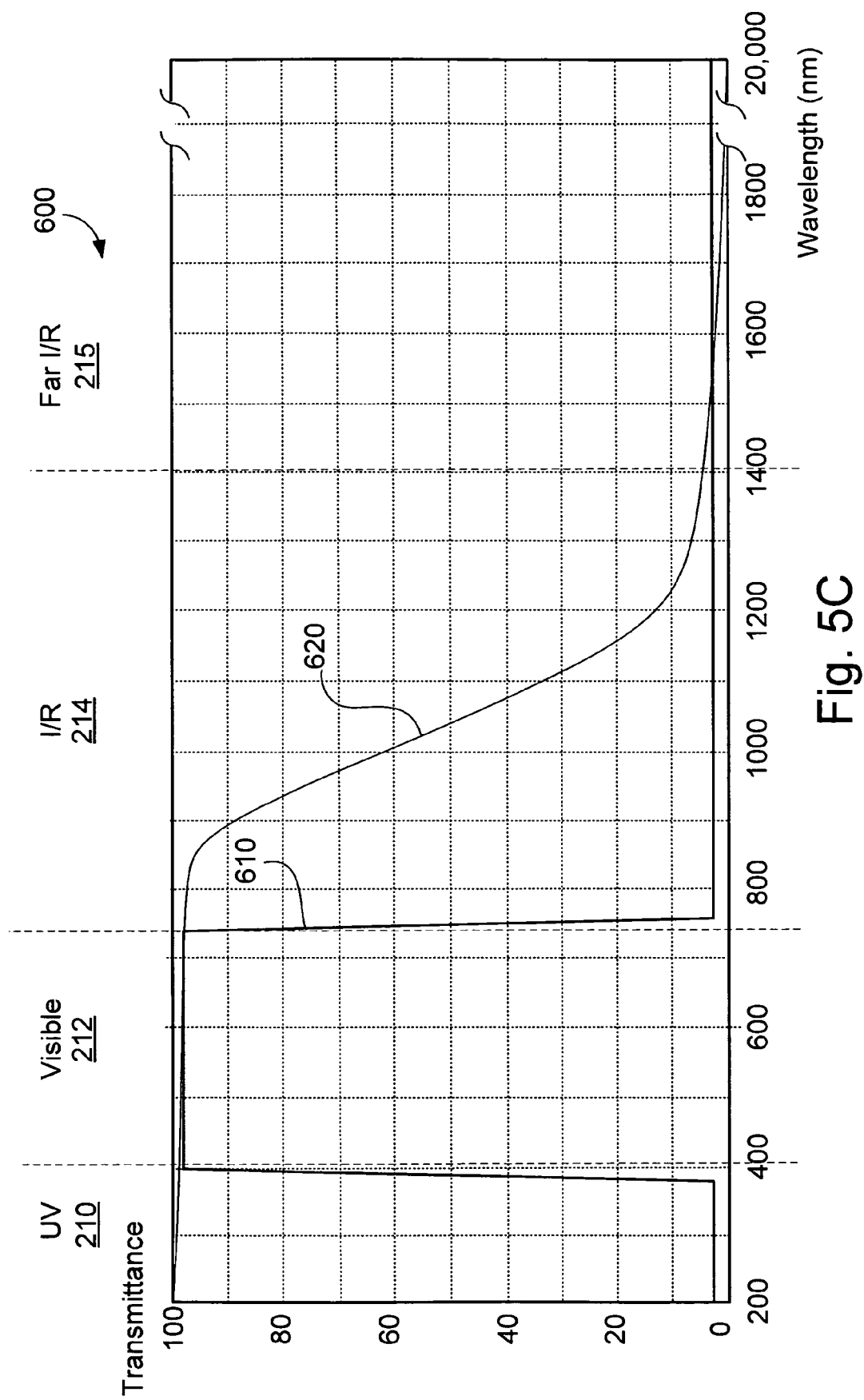
FIG. 5C is an exemplary wavelength vs. transmission chart of a visible high transmission window incorporating both the short-wave band coating and the long-wave band coating.

FIG. 5A is an exemplary chart (400) of one embodiment of a short-wave pass filter transmittance function (410) versus wavelength. As illustrated, the short-wave pass filter allows a large portion of the visible band to be transmitted through the filter window (40) with a sharp cut-off near the IR region but a less sharp and defined cut-off near the UV. FIG. 5B is an exemplary chart (500) of one embodiment of a long-wave pass filter transmittance function (510) versus wavelength. As illustrated, the long-wave pass filter has a sharp cut-off near the UV around 400 nm. The long-wave pass filter is designed to allow transmittance of wavelengths greater than 400 nm which includes the visible light region (212), the near IR region (214), and the far IR region (215) to pass, while reflecting the EM radiation in the UV region (210). Therefore in one embodiment, the short-wave pass filter and the long-wave pass filter are placed in optical series and thus the combined transmittance is restricted to a well-defined band with sharp cut-offs in the visible region from about 400 nm to about 750 nm. FIG. 5C is an exemplary chart (600) of the combined transmittance function (610) of the short-wave and long-wave pass filters in series that illustrates the high transmittance of the EM radiation in the visible region (212) and the reflection of the EM radiation in the UV region (210), near IR region (214), and far IR region (215). In one embodiment, by having the long-wave coating (44) and the short-wave coating (42) on opposite sides of the reflector window (40), they are effectively optically decoupled and can be designed independently to maximize to achieve the sharp transitions on the wavelength boundaries. In addition, the short-wave (42) and long-wave (44) coatings designs can be adapted to include additional dielectric layers to reduce unwanted reflectance loss due to air and reflector window interface index mismatches. Additional layers may be needed between long and short wave pass filter for phase matching between the short-wave and long-wave coatings.

In alternative embodiments, the short-wave coating (42) and long-wave coating (44) can be swapped on either side of the reflector window to gain any desired benefit of thermal cycle, film adhesion, film lifetime, human handling, mechanical handling and chemical non-reaction with gases or trace elements in the reflector, such as Xenon. One method to construct the filter window (40) is to place the short-wave pass filter next to the long-wave pass filter on the same side of the reflector window. This method would require some film thickness and phase matching to achieve the high transmission visible band-pass transfer function (610). However, this method would allow the coating of the filter window (40) to be finished in a single process since the coating is on the same side of the filter window (40) and eliminating a substrate flip. This method may reduce the filter window cost since the entire coating is done in a single process run.

FIG. 6A-6D are exemplary diagrams of some of the possible embodiments of the high transmission filter window. In each of the embodiments, electromagnetic radiation in the form of UV, visible, and IR is incident on the left face of the filter window (40A-40D). In these embodiments, the filter windows (40A-40D) allow for the high transmission of the desired visible light while reflecting back the undesired UV, and IR radiation. In FIG. 6A, high transmission filter window (40A) has the short-wave pass filter (42) on one side of the clear substrate (46). The long-wave pass filter (44) is on the opposite side of the clear substrate (46). The short-wave pass filter (42) in this embodiment is optimally designed to be impervious to any gases or other materials in the reflector cavity. In FIG. 6B, if the long-wave pass filter (44) is better able to withstand the gases or other elements in the reflector cavity, it is placed on the side of the clear substrate (46) and the short-wave pass filter (42) is disposed on the opposite side. In FIG. 6C, if the materials used to create the dielectric coatings that form the pass filters (42, 44) may be reactive to the gases in the reflector cavity, they can both be disposed on the same side of the clear substrate (46) away from the reflector cavity. This embodiment may enhance better thermal cooling, since the film is disposed on the outside of the window. In some applications, the dielectric coatings could be exposed to conditions outside of the light source that might damage them, such as in a dusty abrasive environment. In this case, the pass filters (42, 44) may be disposed on the same side of clear substrate (46) but on the side of reflector cavity. When disposed on the same side of the clear substrate (46) the filter coatings may need an optical decoupling layer or the layer sequence designed accordingly. In addition, a stack of thin films to create far IR filter (48) having the transmission function (620) in FIG. 5 can be added to any of the embodiments in FIGS. 6A-6D (as shown in FIGS. 6C and 6D) to cut off the very far IR radiation (i.e., in mercury lamp and other light sources the IR radiation may extend to 20 um (20,000 nm)).

Figure 7:
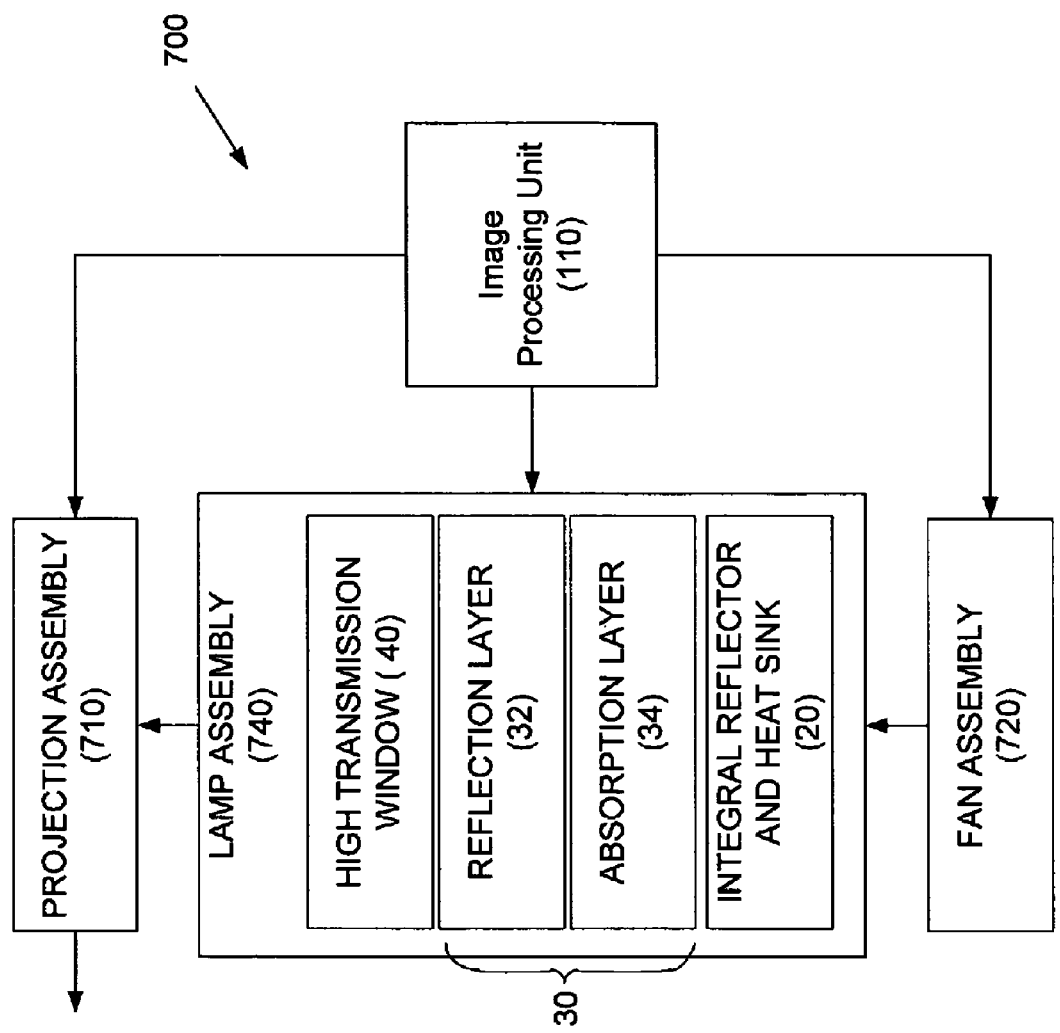
FIG. 7 is a block diagram of an exemplary light source in one embodiment.

FIG. 7 is a block diagram of an exemplary projection system (700) that incorporates a cool light source in a lamp assembly (740). The projection system (700) includes the lamp assembly (740) that supplies light to a projection assembly (710). An image processing unit (110) as described in FIG. 1 is used to control the various interactions of the lamp assembly (740), the projection assembly (710), and a mechanism to cool the lamp assembly (740), a fan assembly (720). The fan assembly (720) is controlled to move air across reflector (20) that includes an integral heat sink to provide for convective cooling. The lamp assembly (740) includes a high transmission window (40) and a reflection layer (32) and an absorption layer (34) disposed upon the reflector (20). EM radiation from the lamp assembly (740) that is within the bands allowed to pass through the transmission window (40) are optically coupled to the projection assembly (710). The EM radiation that does not pass through the transmission window (40) is reflected back by the transmission window (40) to the reflection layer (32) which is also designed to at least partially allow this unwanted or undesired radiation to pass to the absorption layer (34) where it is converted to heat. This converted heat energy is then thermally coupled to the integrated heat sink on the reflector (20) and convectively removed by the fan assembly (720).

Figure 8:
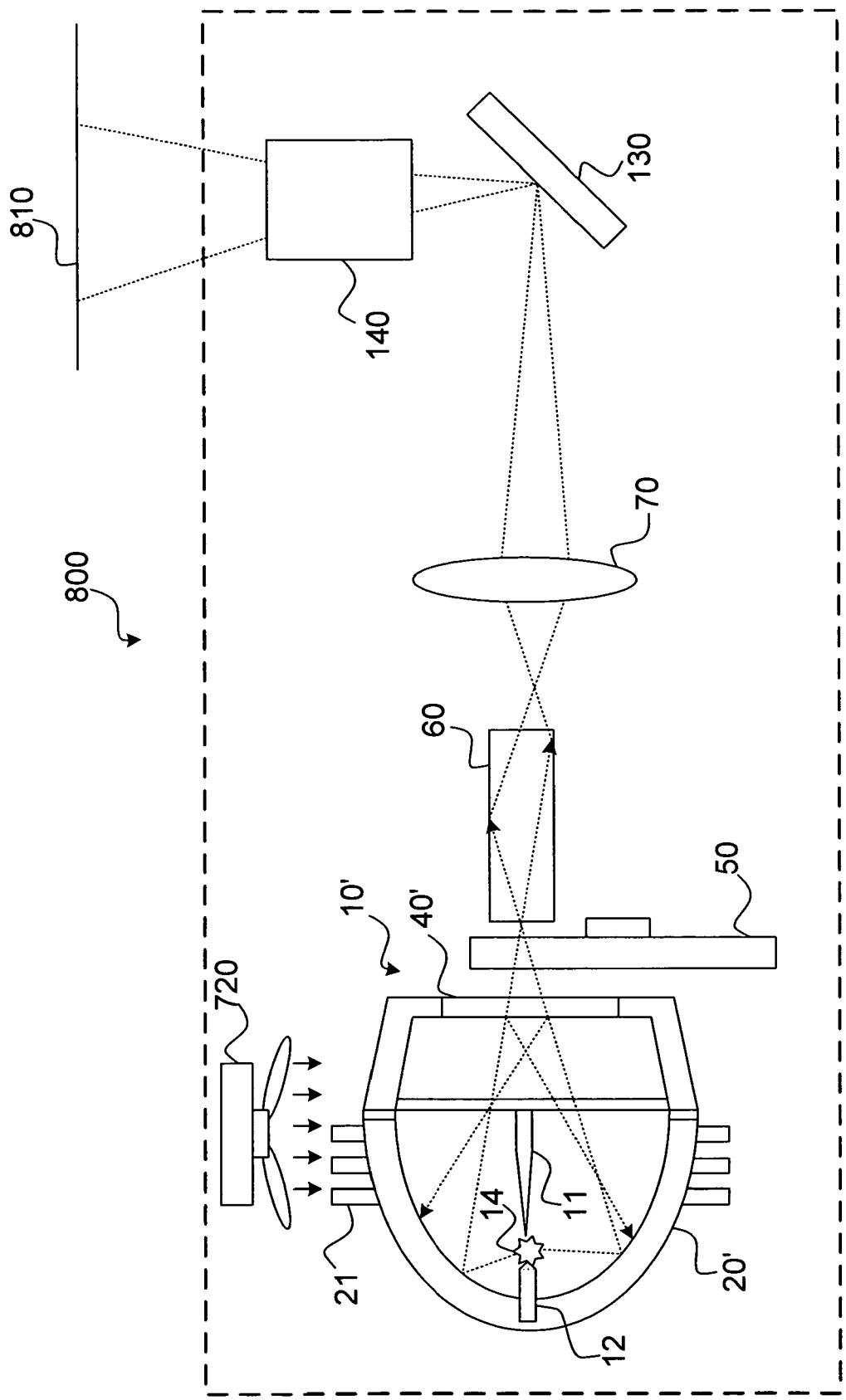
FIG. 8 is a schematical block diagram of a projection system having a Xenon light source according to one embodiment.

FIG. 8 is a simplified schematical diagram of an exemplary projection system (800) which has a xenon cool light source (10') with a reflector window (40') that is used to provide a high transmittance function for visible light but a high reflectance function for non-visible light, such as UV and IR. The reflector (20') includes a heat sink (21) that receives air from a fan assembly (720). The reflector (20') has a cathode (11) and anode (12) that create a fireball (14) within a xenon gas enclosed by the reflector (20') and the reflector window (40'). The reflector (20') has a partial elliptical shape and thus the light generated is focused at the entrance of a spatial homogenizer (60) after passing through a color wheel (50). The color wheel (50) is used to select particular wavelengths from the cool light exiting the reflector (20'). The spatial homogenizer (60) is typically an integrating rod formed of a plurality of mirrors to allow the light entering the integrating rod to make several bounces which ultimately distributes the intensity of the light such that it has a uniform cross-sectional profile upon exit of the integrating rod. The light exiting the integrating rod is then focused with a condensing lens (70) onto a spatial light modulator assembly (130). The spatial light modulator assembly (130) modulates the light to create a still or moving image which is then directed to projection optics (140) to be displayed on a projection screen (810).

Figure 9:
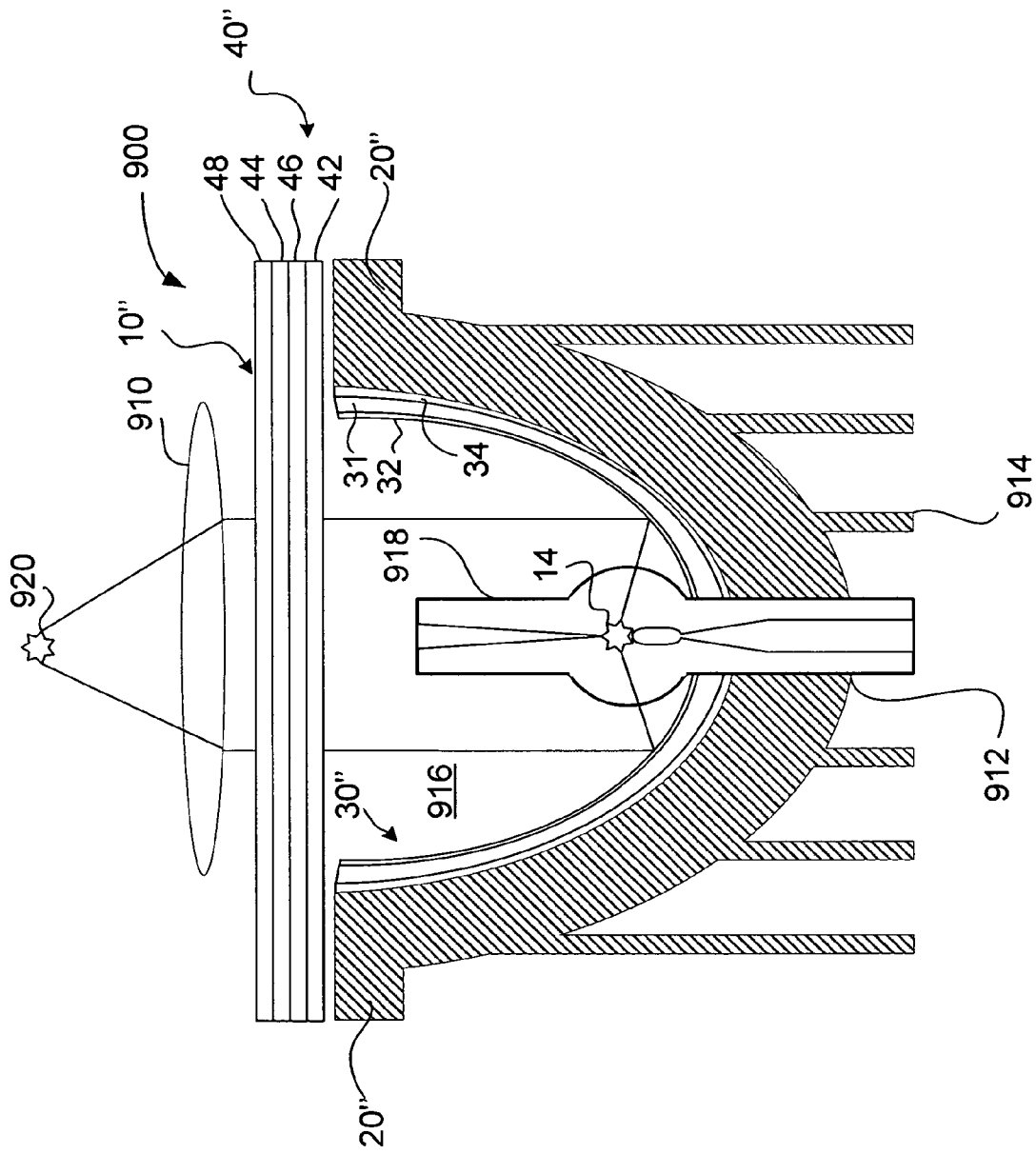
FIG. 9 is a schematical cross-section of a light source having an ultra high pressure mercury arc lamp bulb according to one embodiment.

FIG. 9 is a cross sectional view of an exemplary mercury lamp assembly (900) with cool light source (10") having a high pressure mercury arc bulb (918) in a reflector (20"). The reflector (20") in this embodiment has a parabolic cavity (916) that accepts light from fireball (14) and collimates its. The reflector (20") includes a reflective coating (30") with a reflective layer (32), a decoupling layer (31), and an absorptive layer (34). Desired EM radiation from the fireball (14) is reflected from the reflective layer (32) to a reflector window (40") that includes a short-wave pass coating (42) and a long-wave pass coating (44) and a far IR coating (48) that are disposed on a clear substrate (46). The reflector (20") includes a plurality of heat sink fins (914) and an opening (912) to accept the mercury arc bulb (918). Undesired EM radiation from the fireball (14) is partially transmitted through the reflective layer (32) to the absorptive layer (34) and converted to heat which is conductively transmitted by the reflector (20") to the heat sink fins (914). That undesired EM radiation that is directed or reflected from the reflective coating (32) to the reflector window (40") is re-reflected back to the reflective coating (32) by reflector window (40"). Since the reflective coating (32) is partially absorptive, more of this undesired radiation is absorbed by the absorptive layer (34). By using a parabolic reflector the angle of the light is mostly orthogonal (normal) to the reflective window (40") coatings which allows for a more simplified design. Depending on the application, the collimated EM radiation leaving the reflector window (40") can be refocused with a condenser lens (910) to a second fireball (920).

Figures 10, 11:
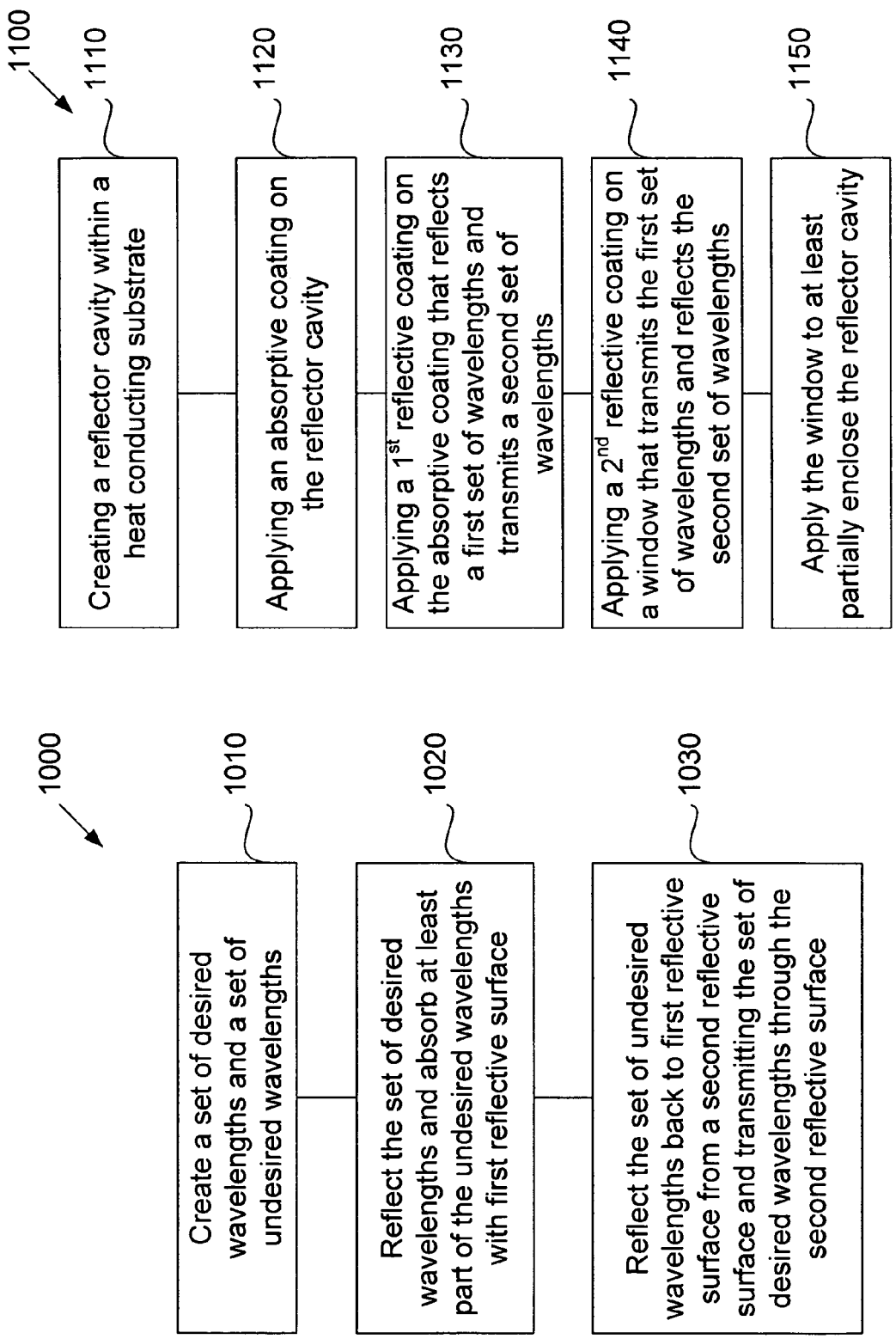
FIG. 10 is a block diagram of an embodiment of a method of using a high transmission filter.
FIG. 11 is a block diagram of an embodiment of a method of making a high transmission filter.

FIG. 10 is a block diagram 1000 of an embodiment of a method of using a high transmission filter. In block 1010, a set of desired wavelengths and a set of undesired wavelengths are created. For instance, in a projector application, the desired wavelengths are visible regions of a xenon light source and the undesired wavelengths are the UV and IR regions. In block 1020, the set of desired wavelengths are reflected from a first reflective surface and at least part of the undesired wavelengths are adsorbed by the reflector cavity. Any remaining undesired wavelengths are directed or reflected to a reflector window, a second reflective surface. For instance, the transmission of undesired wavelengths outside the band of desired wavelengths by the reflective filter coating is greater than 50% on average. In block 1030, the filter window is used to reflect back the set of undesired wavelengths while transmitting the set of desired wavelengths through the second reflective surface. For example, the reflection of undesired wavelengths at the window outside the band of desired wavelengths is greater than 80% on average. One embodiment of the second reflective surface reflecting back the set of undesired wavelengths is to reflect back a first subset of the set of undesired wavelengths with a short-wave pass filter and reflect back a second subset of undesired wavelengths with a long-wave pass filter. In other embodiments, a third subset of undesired wavelengths is reflected back with a far IR filter.

FIG. 11 is a block diagram 1100 of an embodiment of a method of making a high transmission filter. In block 1100, a reflector cavity within a heat conducting substrate, such as aluminum or copper, is created. Next, in block 1120, an absorptive coating is applied on the reflector cavity. Then, in block 1130, a reflective coating is applied on the absorptive coating. This reflective coating reflects a first set of wavelengths from the reflective surface and transmits a second set of wavelengths to the absorptive coating. In block 1140, a filter window is created by applying a second reflective coating on the window that transmits the first set of wavelengths and reflects the second set of wavelengths. One embodiment for applying the second reflective coating includes applying a first set of dielectric coatings that transmit the first set of wavelengths and reflects a first subset of the second set of wavelengths and applying a second set of dielectric coatings that transmit the first set of wavelengths and reflects a second subset of the second set of wavelengths. In block 1150, the filter window is applied to at least partially enclose the reflector cavity.

Different embodiments of the invention include a band-reject reflective reflector that includes heat removal and a band-pass reflective window. The embodiments provide for making optical coatings on a heat removal surface that reflects very efficiently in one bandwidth region (such as visible light) while adsorbing wavelengths outside the bandwidth region. For instance in one embodiment, a reflector assembly for a projector includes a heat conductive assembly defining an electromagnetic (EM) chamber. An absorptive layer is disposed on the EM chamber to absorb ultraviolet (UV) and infra-red (I/R) energy that is generated in the EM chamber by a light source. Various light sources include but are not limited to mercury-arc bulbs, Xenon-arc bulbs, metal halide and halogen light sources. In one embodiment, a dielectric is disposed on the absorptive layer, such as frit glass ($SiO_2$). The frit glass may be hand polished or otherwise finished to provide a smooth optical surface. A filter is disposed on the dielectric that allows a first band of frequencies (or alternatively wavelengths ($\lambda$), where freq. $=1/\lambda$) to reflect a desired band while allowing other undesired frequencies to pass through to the absorptive layer. The dielectric provides for isolation (decoupling) of the reflection filter from the absorptive layer and allows for ease of coating the filter over the absorptive layer. Further the dielectric allows for smoothing out the surface of the absorptive layer such as by polishing. The dielectric may be deposited in a highly compressed state and then later baked to create micro-cracks to relieve the internal stress while still maintaining good optical properties. The heat conductive assembly, convectively or radiantly through emissions, transfers the heat generated by the undesired energy in the absorptive layer and further to the ambient environment. Optionally, a fan or other heat removal device is used to further dissipate the heat away form the reflector assembly.

In one embodiment of a reflector for a projector, a metal assembly of aluminum or copper or combinations thereof is used to define a shaped surface for concentrating or otherwise focusing light from a light source. Such shaped surfaces include ellipsoid or parabolic surfaces although other hyperbolic or angled surfaces can be used. In one embodiment, a UV and I/R absorptive filter layer is disposed on the shaped surface. A decoupling layer is disposed on the UV and I/R filter layer. The decoupling layer is transparent to UV and I/R energy and is of a sufficient thickness such that it is greater than the coherence length of the light source. A reflective surface is disposed on the decoupling layer for reflecting visible light while passing through UV and I/R. For instance, to effectively design a filter which can work up to 5 um, the decoupling layer needs to be at least 5 um to avoid any interference, since mercury arc lamps emit EM radiation up to 15 um in wavelength. In another embodiment, a full set of dielectric layers are disposed on the shaped surface to provide for both the absorptive function and reflection function for the various bands of wavelengths. In this embodiment, a decoupling layer is not required. Similarly, dielectric layers as required are deposited or otherwise applied or disposed on the reflector window to provide the transmission of the visible light and reflection of the UV and IR energy.

More generally, embodiments of the invention can include any optical assembly that couples a light source adapted to create electromagnetic radiation and a fixture for holding the light source that defines an optical cavity. A band-reject filter is deposited on the optical cavity to reflect a range of desired light frequencies and further adsorb electromagnetic energy outside the range of desired light frequencies. A heat removal device integrated into the optical assembly dissipates the absorbed electromagnetic energy. A reflector window with the complementary reflection properties of reflecting the same frequencies as the absorbed electromagnetic energy but transmitting the electromagnetic energies reflected by the band-reject filter is applied to the reflector assembly to at least partially enclose the optical cavity.

Another method of creating a filtered light source for an optical projector is to create a wide-band light source spanning from the infra-red (I/R) to the ultraviolet (UV). The I/R and UV light from the wide-band light source is filtered with dielectric coatings to create both a white light output and a thermal radiant output. The thermal radiant output is transferred to a heat-sink forming an optical device that the dielectric coatings are disposed on to allow the optical device to project the white light output. The white light output is allowed to pass through a high transmission filter window while any remaining thermal radiant output is reflected back by the high transmission filter window to be further transferred to the heat-sink.

Generally, the metal reflector has a coefficient of thermal expansion (CTE) substantially different from the CTE of the glass decoupling layer and the CTE of the absorptive layer if the absorptive black layer is non-metallic. Most deposition process are high energy processes resulting in coating deposition under highly compressed stresses. During thermal cycling the tensile stresses are relieved by the store compressive stresses in the coating structure. In case the tensile stresses exceed the stored compressive stresses the deposited coating will fracture to relieve the strain. However, the microfractures are not going to affect the system optical performance significantly as long as the scattering of light can be collected and focused down to spatial homogenizer such as an integrating tunnel. The absorptive surface may be fabricated to include one or more metal dielectric coatings in the absorptive layer selected for their absorption capabilities in a particular wavelength region.

For instance, an anti-reflective (AR) coating on the metal reflector by using a dielectric phase matching layer includes $MgF_2$ and a thin film of chromium black to create a broadband black layer. In one embodiment, instead or in addition, the absorptive surface includes anodized frit glass. Alternatively, the absorptive surface can be grown or otherwise created from metal reflector assembly such as by thermal oxidation or chemical treatment of the metal reflector surface. In addition, the absorptive surface can include microcrystalline materials. The absorptive surface may be composed of chromium black or germanium black directly deposited on a aluminum or copper surface. In one embodiment, the metal reflector is aluminum and the absorptive layer is aluminum nitride. This embodiment can be made by bombarding the aluminum substrate in nitrogen to create the aluminum nitride that is a very stable black layer (also called aluminum black). This embodiment allows for depositing the high reflectance coating directly on the absorptive layer with or without the decoupling layer.

A glass (or other decoupling) layer on the reflector or reflector window generally includes a thickness more than 1 micron to decouple the reflective surface from the absorptive surface. This thickness is generally greater than the coherence of the light source. Generally, the glass surface is polished to form a smooth optical surface for the reflective surface. Because the glass material may be deposited with high tensile stress, the optical assembly may be baked or otherwise heat cycled to allow the glass layer to have tensile stress fractures to relieve the stress during typical operation without affecting the optical properties of the glass layer (most glass materials have a very low CTE). The reflective surface may be a deposited metal film or it can be created using one or more dielectric layers on the glass layer. In some embodiments, the reflective surface on the reflector or reflector window may include of layers of $SiO_2$ and tantalum oxide (e.g. $Ta_2O_5$) or Titanium oxide (e.g. $TiO_2$).

The metal reflector may have a set of cooling fins or a heat pipe connected to the metal reflector to allow for the heat removal. Those of skill in the art know several other heat removal options. The optical cavity can optionally be sealed to ambient air or include openings to allow for additional heat flow depending on a desired thermal and optical design.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A reflector having a concave cavity, comprising:
   an absorptive layer disposed on the concave cavity;
   a reflective filter coating disposed on the absorptive layer adapted to reflect a band of wavelengths and to transmit wavelengths outside of the band of wavelengths;
   a window including an optical coating comprising a short-wave filter in optical series with a long-wave filter, said optical coating comprising dielectric layers; and
   additional dielectric layers in said optical coating configured to reduce reflectance loss due to air and window interface index mismatch and for phase matching between said short-wave and long-wave filters.

2. The reflector of claim 1, wherein the optical coating on the window includes at least two separate optical coatings on opposite sides of the window.

3. The reflector of claim 1,
in which the short-wave filter and long-wave filter, are disposed on the distal side of said window.

4. The reflector of claim 1, the reflection of wavelengths at the window outside the band of wavelengths is greater than 80% on average.

5. The reflector of claim 1, wherein the transmission of wavelengths outside the band of wavelengths by the reflective filter coating is greater than 50% on average.

6. The reflector of claim 1, wherein the band of wavelengths is within the visible region and wherein the wavelengths outside of the band of wavelengths include the UV and IR regions.

7. The reflector of claim 1, wherein the reflector is formed of a heat conductive substrate.

8. The reflector of claim 1 wherein the window includes a far IR filter.

9. The reflector of claim 1 further comprising a light source from the group consisting of mercury-arc, xenon-arc, metal halide, and halogen.

10. The reflector of claim 1, further comprising an optical decoupling layer between said short-wave and long-wave filters.

11. The reflector of claim 1, in which said concave cavity is formed in a metal which has a coefficient of thermal expansion (CTE) that is different from a CTE of said absorptive layer.

12. The reflector of claim 1, further comprising a decoupling layer between said absorptive layer and said reflective filter.

13. The reflector of claim 12, in which said concave cavity is formed in a metal which has a coefficient of thermal expansion (CTE) that is different from a CTE of said decoupling layer.

14. A reflector, comprising:
an optical cavity including a means for convectively removing heat;
an absorptive layer disposed in the optical cavity;
a reflective filter; and
a decoupling layer disposed between the absorptive layer and reflective filter;
said reflective filter comprising means for reflecting a set of desired wavelengths, and said absorptive layer comprising means for absorbing at least partially a set of undesired wavelengths and converting the undesired wavelengths to heat; and
means for transmitting the set of desired wavelengths from the optical cavity including means for reflecting substantially the set of undesired wavelengths back to the means for absorbing,
in which the means for transmitting includes a means for reflecting a set of short-wavelengths in optical series with a means for reflecting a set of long-wavelengths, and a number of additional dielectric layers interposed between said means for reflecting a set of short-wavelengths and said means for reflecting a set of long-wavelengths configured to reduce reflectance loss due to air and window interface index mismatch and for phase matching between said means for reflecting a set of short-wavelengths and said means for reflecting a set of long-wavelengths.

15. The reflector of claim 14 further including means for generating the set of desired wavelengths and the set of undesired wavelengths disposed in the optical cavity.

16. A projection system, comprising:
a cool light source having,
an electromagnetic radiator capable of creating a set of desired wavelengths and a set of undesired wavelengths,
a reflector having a reflective coating configured to reflect substantially the set of desired wavelengths and at least partially absorb the set of undesired wavelengths, and
a window having a set of dielectric coatings comprising a short-wave filter in optical series with a long-wave filter configured to transmit substantially the set of desired wavelengths and reflect substantially the set of undesired wavelengths back to the reflective coating and additional dielectric layers in said coatings configured to reduce reflectance loss due to air and window interface index mismatch and for phase matching between said short-wave and long-wave filters; and
a light modulator assembly optically coupled to the cool light source.

17. The projection system of claim 16 wherein the electromagnetic radiator is an arc light source.

18. The projection system of claim 16 wherein the reflective coating on the reflector includes a reflective layer of dielectric coating disposed over an absorptive layer.

19. The projection system of claim 16 wherein the set of dielectric coatings on the window are configured to include a short-wave pass filter in optical series with a long-wave pass filter.

20. The projection system of claim 19 wherein the short-wave pass filter and the long-wave pass filter are on opposing sides of the window.

21. The projection system of claim 19 wherein the short-wave pass filter and the long-wave pass filter on are on the same side of the window.

22. The projection system of claim 19 wherein the short-wave pass filter and the long-wave pass filter are optically decoupled from each other.

23. A method of making a cool light source, comprising:
creating a set of desired wavelengths and a set of undesired wavelengths of electromagnetic radiation;
reflecting substantially the set of desired wavelengths, absorbing at least partially the set of undesired wavelengths, and reflecting any remaining set of the undesired wavelengths off of a first reflective surface; and
reflecting substantially the set of undesired wavelengths with a second reflective surface back to the first reflective surface and transmitting the set of desired wavelengths through the second reflective surface including forming the second reflective surface from a short-wave pass filter in optical series with a long-wave pass filter, both said filters being disposed on a same side of a window that comprises said second reflective surface
and applying a number of additional dielectric layers interposed between said short-wave pass filter and long-wave pass filter configured to reduce reflectance loss due to air and window interface index mismatch and for phase matching between the short-wave and long-wave filters.

24. The method of claim 23 wherein reflecting substantially the set of undesired wavelengths with a second reflective surface includes reflecting a first subset of the set of undesired wavelengths with a short-wave pass filter and reflecting a second subset of the set of undesired wavelengths with a long-wave pass filter.

25. The method of claim 23 further comprising converting the absorbed undesired set of wavelengths to heat and convectively radiating the heat from the cool light source.

26. The method of making a cool light source, comprising:

creating a reflector cavity within a heat conducting substrate;

applying an absorptive coating on the reflector cavity;

applying a first reflective coating on the absorptive coating that reflects a first set of wavelengths and transmits a second set of wavelengths;

applying a second reflective coating on a window that transmits the first set of wavelengths and reflects the second set of wavelengths to create a reflector window; and applying the reflector window to at least partially enclose the reflector cavity, in which applying the second reflective coating on a window includes applying a first set of dielectric coatings that transmit the first set of wavelengths and reflects a first subset of the second set of wavelengths and applying a second set of dielectric coatings that transmit the first set of wavelengths and reflects a second subset of the second set of wavelengths, and applying a number of additional dielectric layers interposed between the first set of dielectric coatings and the second set of dielectric coatings configured to reduce reflectance loss due to air and window interface index mismatch and for phase matching between the first set of dielectric coatings and the second set of dielectric coatings.

27. The method of claim 26 wherein applying the second reflective coating on a window includes applying a third set of dielectric coatings that transmit the first set of wavelengths and reflects a third subset of the second set of wavelengths.

* * * * *

UNITED STATES PATENT AND TRADEMARK OFFICE
CERTIFICATE OF CORRECTION

Page 1 of 1

PATENT NO.        : 7,830,075 B2
APPLICATION NO.   : 11/262195
DATED             : November 9, 2010
INVENTOR(S)       : Kuohua Wu It is certified that error appears in the above-identified patent and that said Letters Patent is hereby corrected as shown below:

In column 4, lines 41-42, delete "1400 nm) cut" and insert -- 1400 nm), and a cut --, therefor.

In column 11, line 2, in Claim 3, delete "filter," and insert -- filter --, therefor.

Signed and Sealed this
Thirteenth Day of December, 2011

David J. Kappos
*Director of the United States Patent and Trademark Office*